United States Patent [19]

Shannon et al.

[11] 3,710,302

[45] Jan. 9, 1973

[54] BUS DUCT WITH HINGED COVER FOR PLUG-IN REGION

[75] Inventors: Bill M. Shannon, Rochester; Charles L. Weimer, Beaver Falls, both of Pa.

[73] Assignee: Westinghouse Electric Corporation, Pittsburgh, Pa.

[22] Filed: May 24, 1971

[21] Appl. No.: 146,205

[52] U.S. Cl. .............................. 339/22 B, 174/99 B
[51] Int. Cl. .............................................. H01r 13/60
[58] Field of Search .............. 339/22; 174/88 B, 99 B; 287/36 D; 220/31 S

[56] References Cited

UNITED STATES PATENTS

| | | | |
|---|---|---|---|
| 3,566,331 | 2/1971 | Stanback et al. | 339/22 |
| 2,765,488 | 10/1956 | Ruff | 220/31 S |
| 3,425,587 | 2/1969 | Duross | 220/31 S |
| 3,456,781 | 7/1969 | Bradbury | 206/52 |

Primary Examiner—Marvin A. Champion
Assistant Examiner—Robert A. Hafer
Attorney—A. T. Stratton, Clement L. McHale and W. A. Elchik

[57] ABSTRACT

A section of plug-in type bus duct comprises a plug-in region at an opening in the housing of the duct. A plug-in insulating member, having opening means therein, is supported in the housing at the plug-in region. A plug-in cover is pivotally mounted on the insulating member to cover the opening means in the insulating member. The cover is formed with a resilient latch at the pivoted end thereof that cooperates with the housing to maintain the cover in the open position and another resilient latch at the opposite end thereof that cooperates with the insulating member to maintain the cover in the closed position. The parts are constructed such that the plug-in cover is captured on the insulating member when the insulating member is mounted in the housing.

8 Claims, 6 Drawing Figures

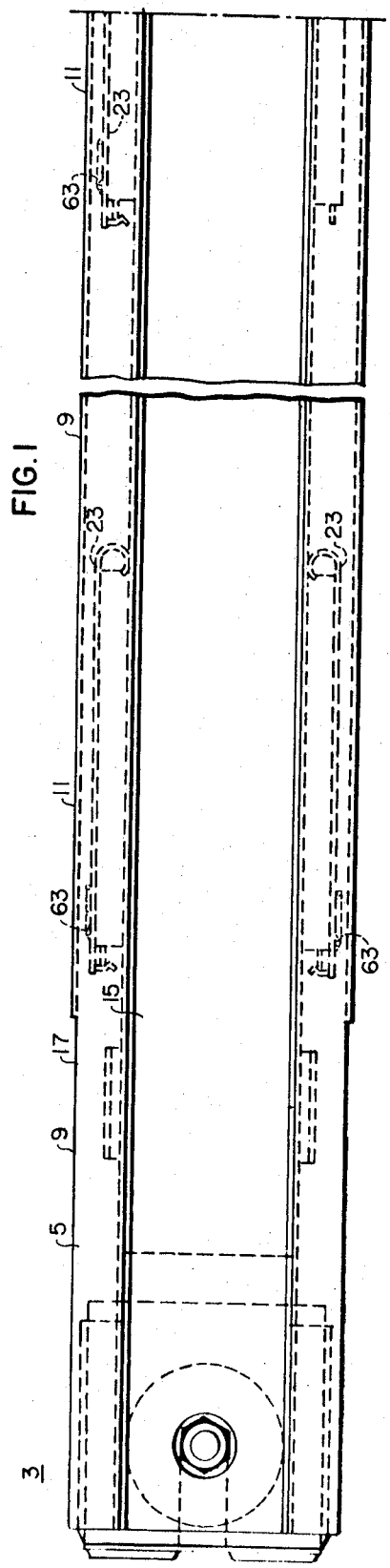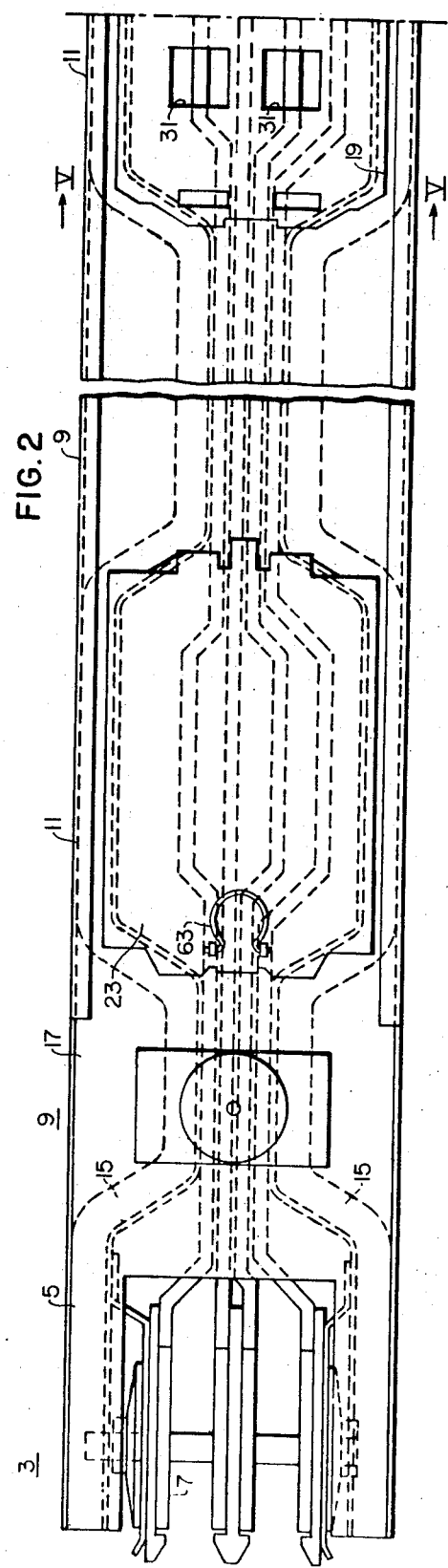

BUS DUCT WITH HINGED COVER FOR PLUG-IN REGION

CROSS-REFERENCES TO RELATED APPLICATIONS

Certain features of the herein disclosed bus duct are disclosed in the copending applications of Charles L. Weimer et al. Ser. No. 146,204 and the application to Charles L. Weimer Bus Duct With Improved Means For Connecting Housing Structures, Ser. No. 146,204 both of which applications are filed concurrently herewith.

BACKGROUND OF THE INVENTION

1. Field of the Invention

Plug-in type bus duct.

2. Description of the Prior Art

It is old in the art to provide plug-in type bus duct comprising a housing having an opening therein at a plug-in region with a plug-in insulating member disposed in the housing at the plug-in region for insulating adjacent bus bars and plug-in elements from each other. This invention is an improvement over the prior art in that improved cover means is provided at the plug-in region for closing off the opening in the housing when a plug-in unit is not installed at the plug-in region.

SUMMARY OF THE INVENTION

An elongated section of bus duct comprises an elongated housing and a plurality of elongated bus bars supported in the housing. Each of the bus bars comprises a pair of wide area faces and a pair of narrow area faces. The bus bars are supported in the housing in a generally stacked relationship with the wide area faces thereof being in a face-to-face relationship. A plurality of plug-in regions are provided along the length of the section. At each of the plug-in regions the housing is provided with opening means therein and a plug-in insulating member is supported in the housing at the opening means. The plug-in insulating member is provided with opening means therein for receiving plug-in power take-off members of a plug-in unit. The plug-in insulating member is a molded insulating member molded to provide hinge pin parts as an integral part thereof. A metallic plug-in cover member is formed with a pair of hinge members formed integrally therewith that cooperate with the hinge pin parts of the insulating member to pivotally support the plug-in cover on the plug-in insulating member. The plug-in cover comprises a first resilient latch at the pivoted end thereof that cooperates with a latch part of the insulating member to maintain the plug-in cover member in the open position. The plug-in cover member comprises a second resilient latch at the free end thereof that cooperates with another latch part of the insulating member to maintain the plug-in cover in the closed position. The plug-in cover member is captured in place when the plug-in insulating member is mounted on the housing.

BRIEF DESCRIPTION OF THE DRAWINGS

FIG. 1 is a top plan view, with parts broken away, of part of a section of bus duct constructed in accordance with principles of this invention;

FIG. 2 is a side view, with parts broken away, of the part of the section of bus duct seen in FIG. 1;

DESCRIPTION OF THE PREFERRED EMBODIMENT

Figure 3:
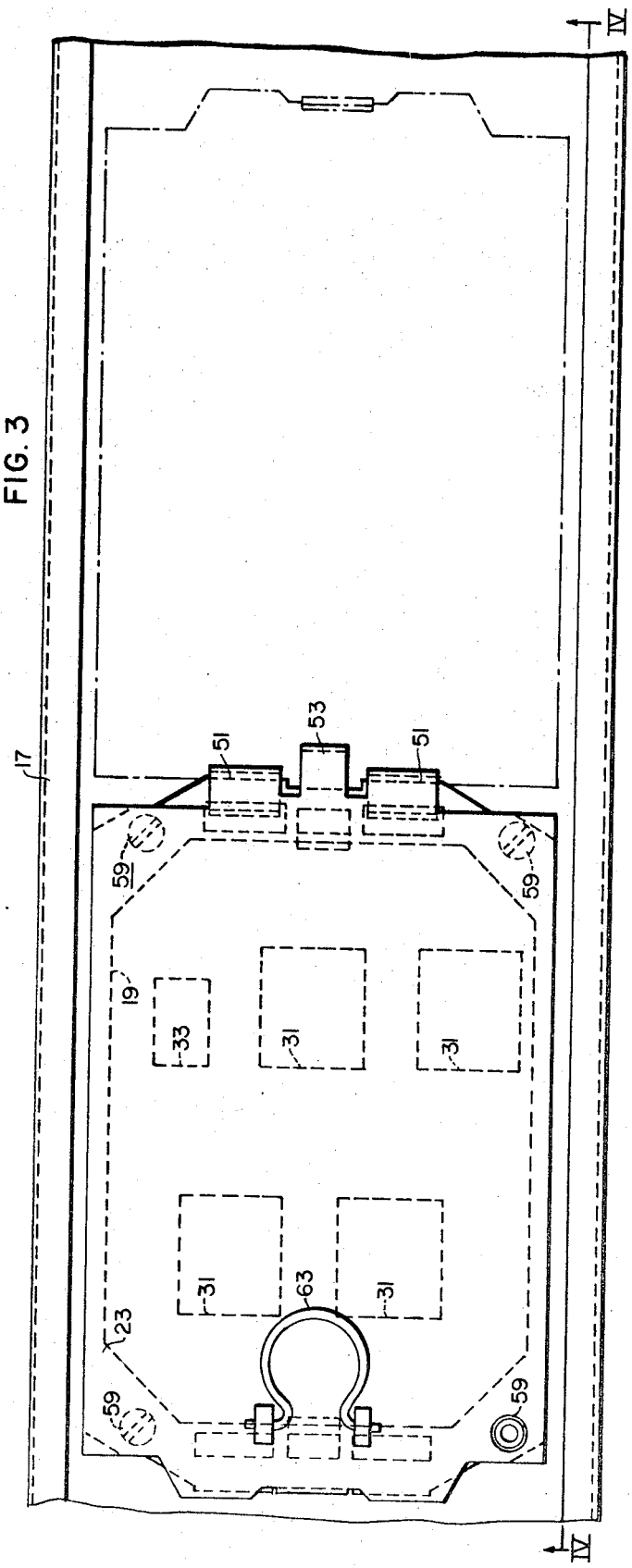
FIG. 3 is an enlarged view of part of the bus duct as shown in FIG. 2 with the hinged plug-in cover being shown in the closed position in full lines and in the open position in broken lines.

Referring to the drawings, there is shown, in FIGS. 1 and 2, part of an elongated section 3 of bus duct. The bus duct is of the type more specifically described in the above-mentioned patent application of Charles L. Weimer Ser. No. 146,204 and in the above-mentioned application of Charles L. Weimer Ser. No. 146,202 both of which applications are filed concurrently therewith. Thus, only a brief description of the general construction of the bus duct is provided herein. The section of bus duct 3 comprises a housing 5 and a set of four bus bars 17 supported in the housing 5. The section 3 is an elongated section comprising a plurality of compact regions 9 and a plurality of plug-in regions 11 along the length of the section. The compact regions 9 and plug-in regions 11 are alternately disposed along the length of the section. The section 3, as described in the above-mentioned patent appliation of Charles L. Weimer et al. Ser. No. 146,204, comprises five plug-in regions 11 with compact regions 9 on the opposite end of each of the plug-in regions 11 along the length of the section.

The bus bars 7 are sandwiched together in a compact relationship at all of the compact regions 9 and they are off-set at all of the plug-in regions 11 to facilitate the tap off of power at the plug-in regions. Each of the bus bars 17 comprises a conducting bar having an insulating sleeve thereon with the insulation being cut away at the ends of the bus bar and at selected areas of each plug-in region to permit electrical connection with adjacent bus bars at the ends of the bus bars and with clip-on type plug-in members at the plug-in regions.

Figure 5:
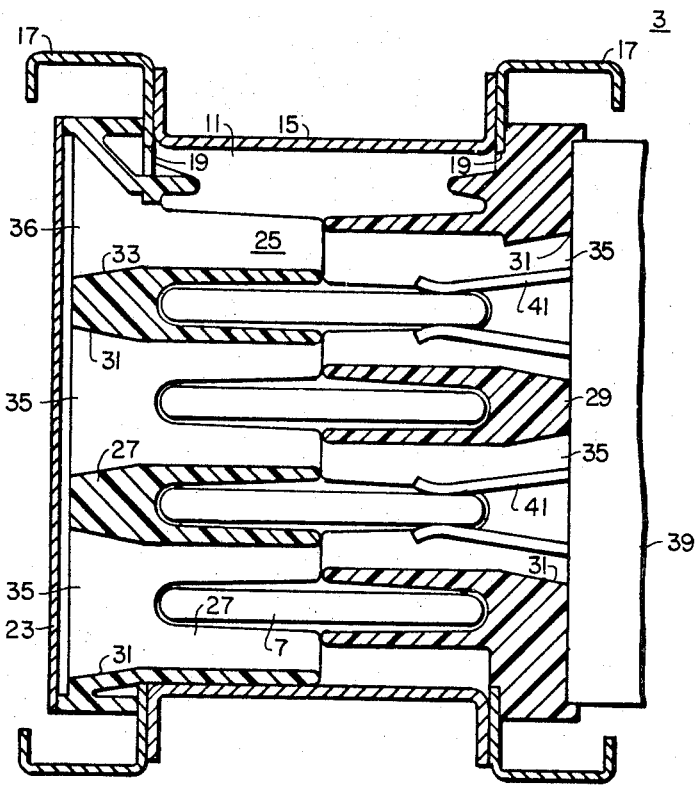
FIG. 5 is a sectional view taken generally along the line V—V of FIG. 2 with the one plug-in cover in the open position and with part of a plug-in unit added at one side to illustrate the connection of plug-in members with bus bars within the housing.

The housing 5 comprises a first pair of opposite housing members 15 and a second pair of opposite housing members 17 which cooperate to provide an elongated tubular housing structure. As can be seen in FIG. 5, each of the housing members 15 is generally U-shaped in cross section. Each of the housing members 17 is generally C-shaped in cross section with the ends of the legs thereof bent in toward each other. As can be seen in FIG. 5, there is an opening 19 in each of the housing members 17 at each plug-in region to facilite power take-off in a manner to be hereinafter described. As can be understood with reference to FIGS. 1 and 2, the housing members 15 are formed with a tortuous path along the length thereof extending toward each other at the compact regions 9 to compact the bus bars 17 therebetween in a sandwiched relationship and extending away from each other at the plug-in regions 11 to provide space in order to facilitate the take-off of power. The bus bars 17 are also formed to provide the compact regions 9 and the spaced plug-in regions 11. The housing members 15 are members of aluminum or base alloys of aluminum in order to provide for heat dissipation from the bus bars 17. The housing members 17 are rigid members of steel to provide structural strength. During assembly of the bus duct, the bottom of the housing members 15 (FIG. 5) is welded or otherwise fixedly secured to the two housing members 17. Thereafter, the bus bars 17 are moved down into the mounted position on the three housing parts. Thereafter, the top or uppermost of the housing members 15 is pressed into the position shown in FIG. 2 sandwiching the bus bars 7 between the housing members 15 at the compact regions 9 in a compact relationship, and a plurality of bolts or screws are utilized to screw the uppermost housing member 15 to the two housing members 17 to thereby secure the housing members in place.

At each of the plug-in regions 11 there is an opening 19 at each of the two opposite sides of the bus duct. A separate sheet metal plug-in cover member 23 is provided for covering each of the openings 19. The cover member 23 is left off of the housing at the part of the plug-in region 11 that is on the right side of the drawing as shown in FIG. 2 for the purpose of illustrating the plug-in region 11.

As can be understood with reference to FIG. 5, there is a plug-in insulating means 25 supported in the housing 5 at each of the plug-in regions 11. Each of the plug-in insulating means 25 comprises a pair of plug-in insulating members 27 and 29. Each of the plug-in insulating members 27, 29 is a rigid molded insulating member. Each of the plug-in insulating members 27, 29 is provided with four openings 31 (FIGS. 2 and 4) therein each of which openings 31 is disposed over a different one of the four bus bars 7. Each of the plug-in insulating members 27, 29 is provided with a fifth opening 33 (FIG. 4) therein which is positioned to be over a ground bus bar when a ground bus bar is used in the system. Each of the openings 31 leads into a separate well cavity 35 (FIG. 5) with each well cavity being separated from the adjacent well cavities by means of the insulating barrier means of the plug-in insulating member.

At each of the plug-in regions 11, a plug-in unit 39 can be mounted to either or both sides of the bus duct to tap power off of the bus bars. The plug-in unit 39 may be a standard type of unit comprising a separate clip-on type plug-in member 41 for each of the bus bars. Only two of the plug-in members 41 are seen in FIG. 5, it being understood that two additional plug-in members 41 are also part of the unit disposed in separate wells 35 connected to the other two bus bars 7 so that there is a separate plug-in member 41 clipped on to each of the four bus bars 7. If a ground bar is provided in the system, a fifth plug-in member 41 is utilized with the plug-in unit 39 to extend into the associated well 36 to connect to the ground bus bar. The plug-in unit 39 may be suitably secured to the housing 5 in the plug-in position.

Figure 4:
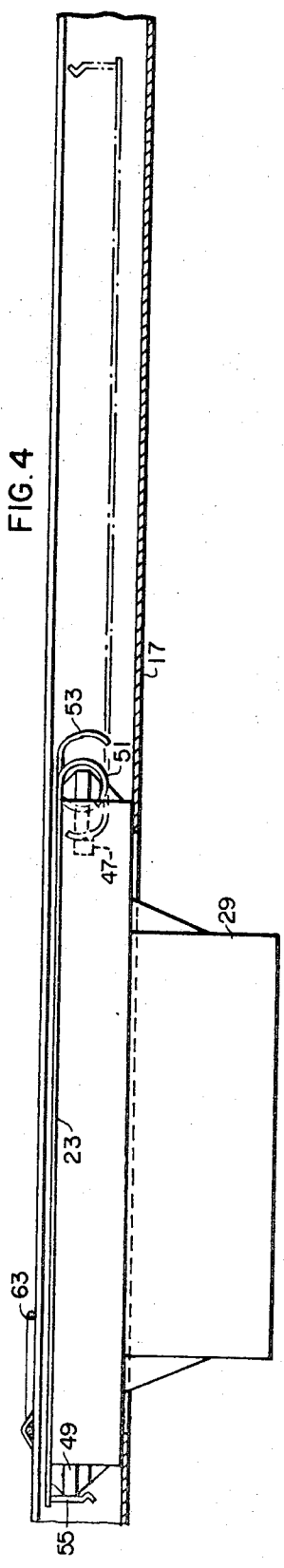
FIG. 4 is a sectional view taken generally along the line IV—IV of FIG. 3.
Figure 6:
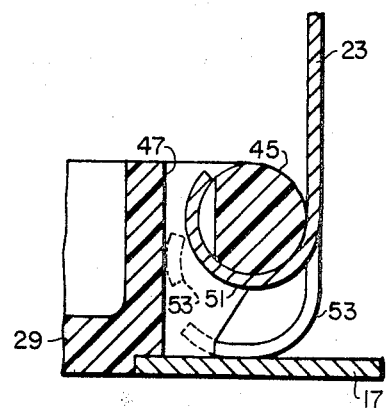
FIG. 6 is an enlarged sectional view illustrating the hinge mounting of the plug-in cover on the plug-in insulating member.

Referring to FIGS. 3, 4 and 6, each of the plug-in insulating members is molded with a pair of hinge-pin parts 45 molded integral with the member which hinge-pin parts 45 provide generally cylindrical hinge surfaces. Each of the plug-in insulating members is also molded with an integral latch part 47 molded integral therewith and disposed intermediate the two hinge-pin parts 45. Each plug-in insulating member is also provided with a molded integral latch part 49 (FIG. 4) at one end thereof. The plug-in cover 23 is a one piece sheet metal member formed with a pair of hinge parts 51, a resilient latch 53 intermediate the hinge parts 51 and a resilient latch 55 at the free end opposite the hinge parts 51.

During assembly of the bus duct section 3, after the bus bars 7 and housing parts 15, 17 are assembled and secured together in the manner previously described, the plug-in covers 23 are mounted on the plug-in insulating members 27, 29 and the plug-in insulating members 27, 29 are then moved in through the openings 19 in the housing member 17 to the position shown in FIG. 5. Thereafter, each of the plug-in insulating members 27, 29 is secured to the associated housing member 17 by means of four screws 59 (FIG. 4) to thereby secure the plug-in insulating members in place thereby capturing the plug-in covers 23 in place on the plug-in insulating members. Before the plug-in insulating member 29, for example, is mounted in position the associated plug-in cover member 23 is disposed generally in the vertical position seen in FIG. 6 and moved upward so that the hinge parts 51 of the plug-in cover 23 engage the hinge-pin parts 45 of the plug-in insulating member 29. The plug-in insulating member 29, with the plug-in cover 23 thereon, is then moved into the associated opening 19 and screwed into place by means of the screws 59 to thereby capture the plug-in cover member 23 on the assembly. As can be understood with reference to FIG. 4, when the plug-in cover member 23 is moved to the closed position the latch 55 thereon resiliently latches with the latch part 49 of the plug-in insulating member 29 to thereby maintain the plug-in cover 23 in the closed position. When it is desired to open the plug-in cover 23 to thereby provide access to the plug-in region for a plug-in unit 39, the cover 23 is pivoted in a clockwise (FIGS. 3 and 6) direction about the hinge-pin parts 45. As the plug-in cover 23 nears a 90° position (FIG. 6) the resilient latch 53 wipes by the cover 17 and when the cover 23 reaches the fully open position (shown in broken lines in FIG. 3) the latch 53 resiliently catches the latch part 47 of the plug-in insulating member 29 to thereby latch the cover 23 in the open position seen in broken lines in FIG. 3. A handle ring 63 (FIGS. 3 and 4) is secured to the outer part of each cover 23 to facilitate grasping and opening of the associated cover 23. In addition to providing for latching the cover 23 in the open position, the latch 53 helps to provide that the cover 23 is captured on the plug-in insulating member 29 when the insulating member 29 is secured to the housing by means of the four screws 59. It can be understood with reference to FIG. 6, when the cover 23 is tilted, for example, to the 90° position, the cover 23 cannot be forcefully moved downward to be snapped out of the mounted position because the latch 53 engages the cover 17 to limit downward movement of the cover 23. When the cover 23 is in the open position the hinge parts 51 prevent removal of the cover and when the cover is in the closed position the latch 55 prevents removal of the cover 23. Thus, the cover 23 is captured on the insulating member 29 when the insulating member 29 is mounted on the housing 5.

We claim:

1. An elongated section of bus duct comprising a housing, a plurality of bus bars supported in said housing, a plug-in region along the length of said section, said housing at said plug-in region having opening means therein, a plug-in insulating member supported in said housing at said opening means, said plug-in insulating member having opening means therein for receiving plug-in power take-off members of a plug-in unit, said plug-in insulating member being a molded insulating member with hinge-pin means molded integral therewith, a plug-in cover comprising a sheet metal member with hinge means formed integrally therewith cooperating with said hinge-pin means to pivotally support said plug-in cover on said plug-in insulating member to cover said opening means in said plug-in insulating member when said plug-in cover is in the closed position, said plug-in cover being pivotally movable on said plug-in insulating member to an open position to provide access to said opening means in said plug-in insulating member, said plug-in cover being mounted on said plug-in insulating member before said plug-in insulating member is mounted in said bus duct housing, securing means securing said plug-in insulating member to said housing, and said plug-in insulating member and said plug-in cover being constructed and arranged such that said plug-in cover is captured in place on said plug-in insulating member when said plug-in insulating member is mounted in said housing.

2. An elongated section of bus duct according to claim 1, said plug-in insulating member comprising a first latch part molded integral therewith, said plug-in cover comprising a first resilient latch, in the open position of said plug-in cover said first latch resiliently engaging said first latch part to latch said plug-in cover member in the open position.

3. An elongated section of bus duct according to claim 2, said plug-in insulating member comprising a second latch part molded integral therewith, and said plug-in cover comprising a second resilient latch resiliently cooperating with said second resilient latch part to latch said plug-in cover in the closed position.

4. An elongated section of bus duct according to claim 3, said first latch of said plug-in cover being disposed at a first end of said plug-in cover in proximity to said hinge part, and said second latch being disposed at the opposite end of said plug-in cover.

5. An elongated section of bus duct according to claim 4, said plug-in insulating member comprising a pair of hinge-pin parts molded integral therewith, said plug-in cover member comprising a pair of hinge parts formed integral therewith cooperating with said pair of hinge-pin parts to pivotally support said plug-in cover on said plug-in insulating member.

6. An elongated section of bus duct according to claim 5, and said first latch of said plug-in cover being disposed intermediate said hinge parts of said plug-in cover.

7. An elongated section of bus duct according to claim 6, said plug-in cover being movable substantially 180° from the closed position to the open position, and said first latch cooperating with said the said first latch part of said plug-in insulating member to latch said plug-in cover in the fully open position.

8. An elongated section of bus duct according to claim 7, said plug-in cover being movable into the mounted position on said plug-in insulating member before said plug-in insulating member is mounted on said housing, securing means for securing said plug-in insulating member on said housing, and said hinge-pin parts said catch parts said hinge parts and said catches along with said housing cooperating to capture said plug-in cover in place on said plug-in insulating member when said plug-in insulating member is in the mounted position on said housing.

* * * * *